US007061972B1

(12) United States Patent
Best

(10) Patent No.: US 7,061,972 B1
(45) Date of Patent: Jun. 13, 2006

(54) GPS RECEIVER HAVING DYNAMIC CORRELATOR ALLOCATION BETWEEN A MEMORY-ENHANCED CHANNEL FOR ACQUISITION AND STANDARD CHANNELS FOR TRACKING

(76) Inventor: Gregory C. Best, 636A Clayton St., San Francisco, CA (US) 94117

( * ) Notice: Subject to any disclaimer, the term of this patent is extended or adjusted under 35 U.S.C. 154(b) by 894 days.

(21) Appl. No.: 10/116,436

(22) Filed: Apr. 4, 2002

(51) Int. Cl.
*H04B 1/69* (2006.01)

(52) U.S. Cl. .................. 375/150; 375/149; 375/130; 375/147; 375/208; 375/316; 342/357; 701/214

(58) Field of Classification Search .............. 375/150, 375/149, 130, 147, 208, 316; 342/357, 357.12; 701/214; 370/320, 335, 465, 329; 455/560, 455/456.1
See application file for complete search history.

(56) References Cited

U.S. PATENT DOCUMENTS

| | | | | |
|---|---|---|---|---|
| 5,420,593 | A | 5/1995 | Niles | 342/357 |
| 5,448,773 | A | 9/1995 | McBurney | 455/343 |
| 5,592,173 | A | 1/1997 | Lau et al. | 342/357 |
| 5,600,670 | A | 2/1997 | Turney | 375/208 |
| 5,650,785 | A | 7/1997 | Rodal | 342/357 |
| 5,949,812 | A * | 9/1999 | Turney et al. | 375/130 |
| 6,091,785 | A | 7/2000 | Lennen | 375/316 |
| 6,496,533 | B1 * | 12/2002 | Lennen | 375/147 |
| 6,879,913 | B1 * | 4/2005 | Yu | 701/214 |
| 6,888,879 | B1 * | 5/2005 | Lennen | 375/149 |

OTHER PUBLICATIONS

Greg Turetzky, Jerry Knight, Chuck Norman "SiRFstarI/LX Low Power GPS Architecture" Proceedings of Institute of Navigation Global Positioning System (ION-GPS), 1997, pp. 75-79.

Greg Turetzky, Sanjai Kohli "A High-Performance, Low Cost, 2-Chip chipset for GPS" Proceedings of Institute of Navigation Global Positioning System (ION-GPS), 1996, pp. 155-159.

* cited by examiner

*Primary Examiner*—Emmanuel Bayard
*Assistant Examiner*—Sudhanshu C. Pathak
(74) *Attorney, Agent, or Firm*—Menlo Patent Agency LLC

(57) ABSTRACT

A GPS receiver having channel clusters each having a memory-enhanced channel and several standard tracking channels. The memory-enhanced channel includes a signal memory for accumulating carrier frequency leveled signal samples over several epochs into supersamples for an epoch. During an acquisition mode the memory-enhanced channel borrows code correlators from the tracking channels and the carrier clock to the tracking channels is disabled. The supersamples are accumulated in the signal memory in realtime and then played back by the code correlators at a faster rate while the signal memory is accumulating a new set of supersamples. During a tracking mode, the signal memory is bypassed, the borrowed code correlators are returned and the carrier clock is enabled to the tracking channels.

18 Claims, 4 Drawing Sheets

GPS RECEIVER HAVING DYNAMIC CORRELATOR ALLOCATION BETWEEN A MEMORY-ENHANCED CHANNEL FOR ACQUISITION AND STANDARD CHANNELS FOR TRACKING

BACKGROUND OF THE INVENTION

1. Field of the Invention

The invention relates generally to global position system (GPS) receivers and more particularly to a GPS receiver having a memory-enhanced channel for acquisition and standard channels for tracking with dynamic code correlator allocation between the enhanced and standard channels.

2. Description of the Prior Art

Satellite positioning system (SATPS) receivers such as Global Positioning System (GPS) and Global Orbiting Navigational System (GLONASS) receivers, make precise determinations of latitude, longitude, elevation and time by using time difference of arrival and Doppler measurement techniques on precisely-timed spread spectrum signals transmitted by orbiting satellites. The transmitted signals contain a number of components designed to enable the receivers to extract the requisite information. In GPS, each satellite transmits two spread spectrum carrier signals centered around separate frequencies. The L1 signal is centered about a frequency of 1575.42 MHz, and is modulated with, among other things, the coarse/acquisition (C/A) pseudo-random noise (PRN) code and the precision (P) PRN code. The C/A-code has a 1.023 MHz chip rate, and the P code has a 10.23 MHz chip rate. The L2 signal is centered around a frequency of 1227.6 MHz and, at present, the only PRN code it carries is the P-code. The PRN codes are different for each of the GPS satellites deployed and allow use of a plurality of GPS satellite signals transmitted at the same frequency. In contrast, each GLONASS satellite transmits using a carrier frequency uniquely assigned to that satellite.

Different types of PRN codes are used for different system applications. For example, within the GPS system, C/A code is used for low cost, less accurate commercial applications, and P-code is used for higher accuracy military applications. Each GPS satellite is assigned PRN codes unique to that satellite. In the case of GLONASS, all satellites use the same PRN code(s). For each SATPS satellite, the transmitted signal comprises the carrier modulated with low frequency (50 Hz, i.e., 20 msec period, for GPS) digital data bits, which include information such as the satellite's ephemeris (i.e., position), current time of day, and system status information, and further modulated with one or more PRN codes.

The typical SATPS receiver receives a composite signal consisting of one or more of the signals transmitted by the satellites within view, that is within a direct line-of-sight, as well as noise and any interfering signals. Because the signal transmitted by each satellite uses a PRN code or a carrier frequency unique to that satellite, the receiver may separate the signals from different satellites using code division multiple access (e.g., each GPS satellite has a unique PRN code) or frequency division multiple access (e.g., each GLONASS satellite has a unique carrier frequency) techniques. The composite signal is first fed to a down-converter which amplifies and filters the incoming composite signal, mixes it with a locally generated carrier reference signal, and thus produces a composite intermediate frequency (IF) signal. For a GPS receiver, a decoder or channel circuit then correlates the composite signal by multiplying it by a locally generated version of the PRN code signal assigned to a particular satellite of interest. If the locally generated PRN code signal is properly timed, the digital data from that particular satellite is then properly detected.

The PRN codes also provide a mechanism to precisely determine the signal transmission time from each satellite. By determining the transmission time from at least four satellites, and knowing each satellite's ephemeris and approximate time of day information, the receiver's three dimensional position, velocity and precise time of day may be calculated. For more information on the format of the GPS system signals, see "Interface Control Document ICD-GPS-200, Sept. 26, 1984", published by Rockwell International Corporation, Satellite Systems Division, Downey, Calif. 90241. For more information on the format of the GLONASS system signals, see "The GLONASS System Technical Characteristics and Performance, Working Paper, Special Committee on Future Air Navigation Systems (FANS), International Civil Aviation Organization (ICAO), Fourth Meeting, Montreal, Quebec, Canada, May 2–20, 1988.

There are many practical applications of SATPS receivers in which low SNR and fast acquisition are desirable, including, for example, operation of GPS receivers indoors, where the SNR available for acquisition and measurements may be substantially below normal GPS minimum received power levels. As another example, when a GPS receiver has been powered down for a significant length of time, knowledge of oscillator offset and time may be degraded. Fast acquisition improvement would allow the receiver to respond quickly after power-on with a position fix. It is important to note that low SNR and fast acquisition operations are not necessarily independent. Since the search for low SNR satellites involves longer integration times, each search bin must be serviced rapidly in order to have reasonable response time.

SUMMARY OF THE INVENTION

Briefly, in a preferred embodiment, a GPS receiver of the present invention includes one or more channel clusters where each channel cluster includes a memory-enhanced channel for signal acquisition and one or more standard channels for signal tracking. The memory-enhanced channel includes a signal memory. For acquisition mode the signal memory accumulates carrier frequency leveled signal samples over several epochs into supersamples for an epoch. During the acquisition mode the memory-enhanced channel borrows code correlators from the standard channels and the carrier and code clocks to the standard channels are disabled. The set of supersamples is accumulated in the signal memory in realtime and then played through the code correlators at a faster rate while the signal memory is accumulating a new set of supersamples. For tracking mode, the signal memory is bypassed, the borrowed code correlators are returned and the carrier and code clocks are enabled to the standard channels.

An advantage of the present invention is that fast acquisition of low SNR signals is obtained by accumulating supersamples, borrowing correlators, and playing back at a fast rate. Another advantage of the present invention is that all of the code correlator hardware can be used all the time regardless of the particular channel in which the hardware nominally resides, thereby minimizing hardware cost.

Another advantage of the present invention is that power consumption is reduced by disabling the clocking of the hardware that is not used during acquisition.

These and other advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
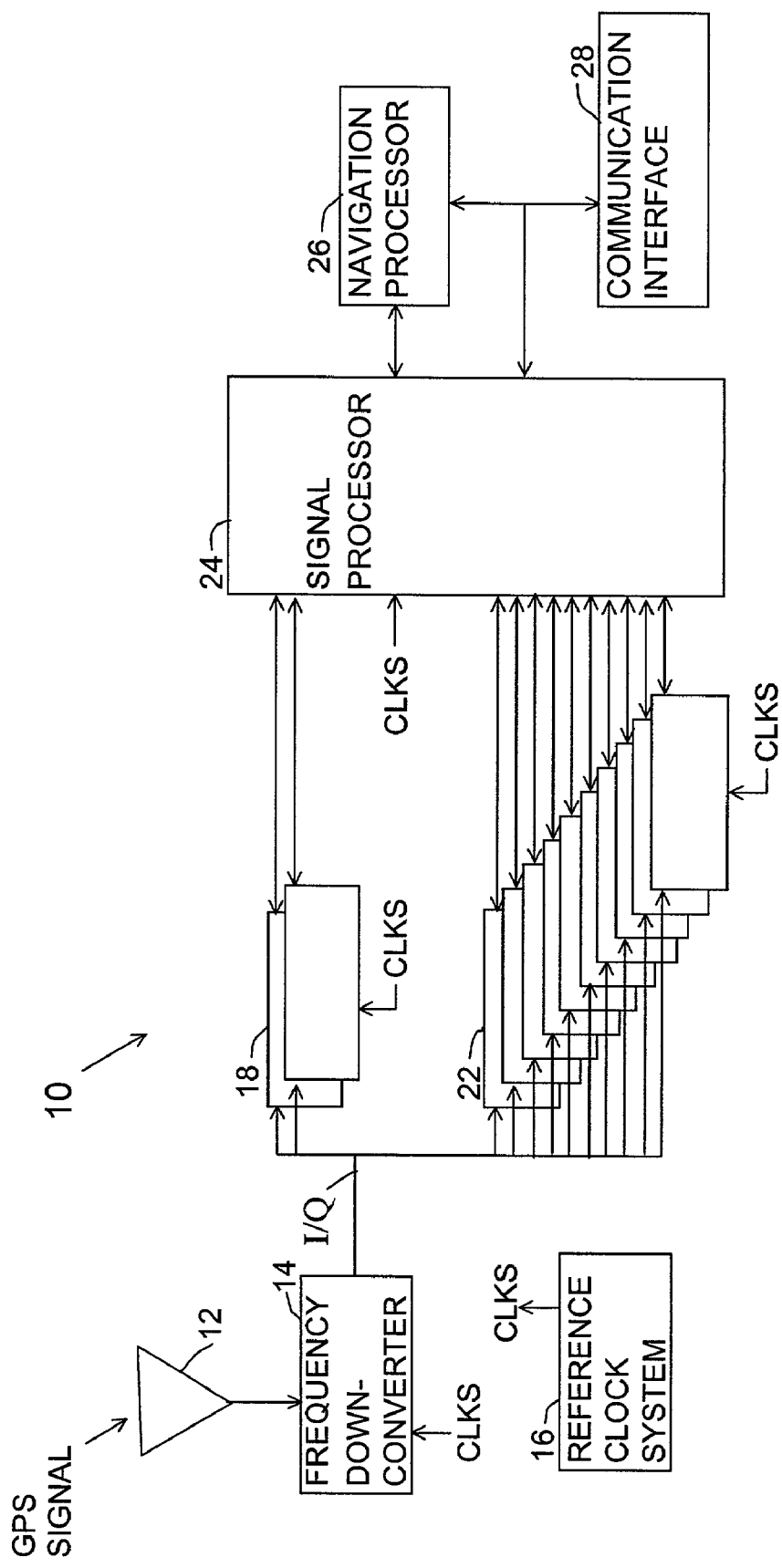
FIG. 1 is a block diagram of a GPS receiver of the present invention.

FIG. 1 is a block diagram of a global positioning system (GPS) receiver of the present invention referred to with a general reference number 10. The GPS receiver 10 processes a GPS signal having a pseudorandom (PRN) code that repeats at a known code time period. The time period for the repeating code is known as an epoch.

The GPS receiver 10 includes a GPS antenna 12, a frequency downconverter 14, a reference clock system 16, one of more enhanced signal channel(s) 18, one or more standard signal tracking channel(s) 22, a signal processor 24, and a navigation processor 26. The GPS receiver 10 may also include a power supply, a digital user interface, a human user interface, and the like for full standalone operation. A wired or wireless communications interface 28 may also be included for receiving information such as orbital parameters or bit transition timing for assisting GPS acquisition. The GPS antenna 12 converts an airwave radio frequency (RF) GPS signal broadcasted by a GPS satellite or pseudolite into a conducted GPS signal. The frequency downconverter 14 uses one or more local clock signals (CLKS) from the reference clock system 16 for downconverting the RF GPS signal to a lower frequency and sampling the lower frequency GPS signal for providing inphase (I) and quadrature phase (Q) sample streams (I/Q) that represent the GPS signal at a lower frequency. The enhanced channels 18 and the standard channels 22 receive the I & Q sample streams.

During a signal acquisition mode the enhanced channels 18 borrow code correlators from the standard channels 22 to provide correlation data to the signal processor 24. The correlation data defines the correlation between the GPS signal and locally generated GPS replica signals. The signal processor 24 uses the correlation data for providing feedback adjustments to the enhanced channels 18 (including the loaned code correlators) for searching the frequency and phase of the replicas until the correlation data shows that the locally generated replicas have sufficient correlation to the incoming GPS signal to indicate that the signal has been acquired.

Once the GPS signal has been acquired, the GPS receiver 10 enters a signal tracking mode. During the signal tracking mode the enhanced channels 18 are reconfigured and the code correlators are returned to operate in a standard tracking manner. The reconfigured enhanced channels 18 and standard channels 22 both provide correlation data to the signal processor 24. The signal processor 24 uses the correlation data for providing adjustments to the reconfigured enhanced channels 18 and the standard channels 22 for fine tuning the frequency and phase of the replicas to maintain sufficient levels of correlation with the incoming GPS signal. The signal processor 24 also uses the correlation data for providing navigation data to the navigation processor 26.

The navigation processor 26 uses the navigation data for determining information such as latitude, longitude, altitude, time, and velocity. Preferably, the signal processor 24 is constructed primarily of digital signal processing (DSP) hardware organized to operate as a state machine, and the navigation processor 26 is implemented primarily with a microprocessor and program code in an electronic memory that is read and acted upon by the microprocessor. However, it should be understood that the actions and operation of the signal processor 24 and the navigation processor 26 are intertwined and that either hardware or software implementations can be used to a greater or lesser extent in one or both the signal and navigation processors 24 and 26. Additional details of the GPS receiver are described in U.S. Pat. No. 6,091,785 by Lennen incorporated by reference herein.

Figure 2:
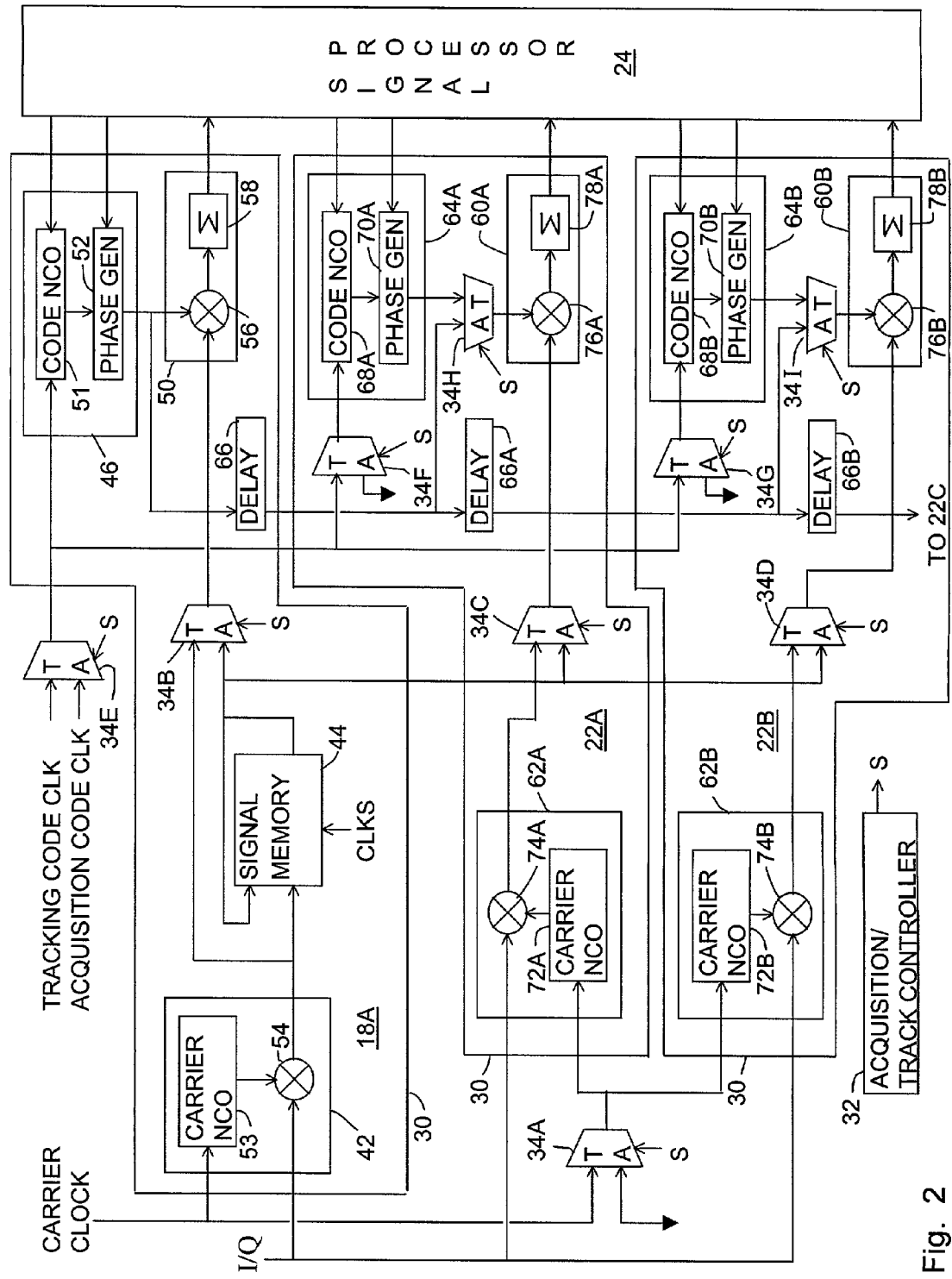
FIG. 2 is a block diagram showing a channel cluster of the GPS receiver of FIG. 1 having a memory-enhanced signal acquisition channel and several standard tracking channels.

FIG. 2 is a block diagram showing the signal processor 24, a channel cluster 30, an acquisition/track controller 32, and an acquisition/track (A/T) switch having sections 34A–J. The channel cluster 30 is shown with one enhanced acquisition channel 18 referred to as channel 18A and two standard tracking channels 22 referred to as channels 22A–B. However, any number of standard channels 22 may be associated with an enhanced channel 18 in the channel cluster 30 and the number may be configured dynamically. Preferably, the ratio of standard channels 22 to enhanced channels 18 is in a range of two to twelve. In one preferred embodiment, the ratio is six. There may be multiple channel clusters 30 in the GPS receiver 10 and each of the clusters 30 may have a different ratio.

The enhanced channel 18A includes a carrier frequency leveler 42, a signal memory 44, a pseudorandom (PRN) code generator 46, and a code correlator 50. The PRN generator 46 includes a code numerically controlled oscillator (NCO) 51, and a PRN phase generator (GEN) 52. The carrier frequency leveler 42 includes a carrier NCO 53 and a carrier mixer 54. The code correlator 50 includes a code mixer 56 and a code accumulator 58.

The carrier NCO 53 adjusts the frequency of a carrier clock received from the reference clock system 16 according to a feedback adjustment received from the signal processor 24 for providing a carrier frequency replica signal for a selected GPS satellite. The carrier mixer 54 multiplies the I & Q sample stream (I/Q) from the frequency downconverter 14 by the carrier frequency replica signal to provide a stream of signal samples, termed herein a frequency leveled sample stream, that corrects (levels) the GPS carrier frequency offsets due to the frequency error of the reference clock system 16 and the Doppler frequency shifts due to the relative motion of the selected GPS satellite and the GPS antenna 12. In the acquisition mode, the feedback adjustment from the signal processor 24 is being adjusted according to search procedures designed in the signal and navigation processors 24 and 26 in order to vary the effective GPS carrier frequency in the sample stream until the frequency offsets are determined. In the tracking mode, the feedback adjustment from the signal processor 24 is being adjusted according to fine tune procedures designed in the signal processor 24 in order to correct the frequency offsets, thereby leveling or providing a constant effective carrier frequency in the sample stream. The effective leveled carrier frequency may be zero frequency or some other selected frequency.

In the acquisition mode, the signal memory 44 accumulates samples that are identically positioned within a code epoch period in the incoming PRN code for several epochs of the PRN code for providing accumulated samples termed herein "supersamples". It should be noted that this process for accumulating supersamples is entirely separate and distinct from the process of accumulating correlations of the incoming GPS signal with respect to a replica of the GPS signal for providing correlation data that is then used for adjusting the replica signal.

In operation, the signal samples in a first epoch are stored one-by-one in first through nth memory locations (corresponding to first through nth code positions) in a live or realtime manner essentially as they are received off the air, downconverted, and sampled by the GPS receiver 10. Continuing in realtime, the first sample in a second epoch is received and added to the stored sample in the first memory location to establish a first supersample, the second sample in the second epoch is added to the stored sample in the second memory location to establish a second supersample, and so on through the nth sample. Still continuing in realtime, the first sample in a third epoch is received and added to the stored supersample in the first memory location, the second sample in the third epoch is added to the stored supersample in the second memory location, and so on through the nth sample. This process of adding samples in realtime according to code position is repeated for however many epochs are required to make a desired accumulation time period.

Then, when the desired number of epochs of realtime samples have been accumulated, the supersamples are processed, preferably at a rate that is faster than the realtime rate, by the code correlator 50 and code correlators 60A and 60B. Once the supersamples have been read for processing, the signal memory 44 is reset and the process of accumulating supersamples is begun again with a new first epoch. In a preferred GPS embodiment, the number of epochs that are accumulated is twenty, thereby yielding a 20 times improvement in signal-to-noise ratio (SNR) as compared to a single epoch. The clock rate for receiving and storing realtime samples may be 2.5 MHz and the clock rate for reading and processing the samples may be 25 MHz, thereby simultaneously providing another 10 times faster code search rate. Together, the effect is a 200 times improvement. It is understood by those knowledgeable in the art of GPS that a bit transition having the effect of inverting the incoming sample stream may occur between any two epochs. In order to avoid having a transition midway within the accumulation period, the timing of the transitions may be obtained either from an external source (e.g., via a communication link), by estimation, or from GPS time obtained previously while tracking a GPS signal.

The code NCO 51 adjusts the frequency of a code clock received from the reference clock system 16 according to a feedback adjustment received from the signal processor 24 for providing code frequency signal for the selected GPS satellite. The phase generator 52 uses the code frequency signal as a time base for generating the PRN code for the selected GPS satellite and then adjusts the position offset of the code according to a feedback adjustment signal from the signal processor 24 or extra cycles from the code NCO 51 for providing a replica code sample stream to the code correlator 50. In the acquisition mode, the phase generator 52 also supplies the PRN code sample stream to the standard channels 22A and 22B.

The processing of the supersamples is shared by the code correlators 50 and 60A–B. The code mixer 56 in the code correlator 50 multiplies the PRN code sample stream from the enhanced channel 18 position-by-position times a portion of the supersamples. In the tracking mode, the code mixer 56 multiplies the replica code samples by the frequency leveled sample stream in a conventional manner. In either mode, the products formed by the code mixer 56 are accumulated in the code accumulator 58 for providing correlation data to the signal processor 24.

The code correlators 50 and 60A–B operate in parallel for the acquisition mode. Each of the code correlators 50 and 60A–B scans the full memory of supersamples comparing against a different internally generated PRN sequence. Typically, these sequences would be different shifts of the same PRN code in order to speed the acquisition of a single selected GPS satellite. However, they can be different PRN codes. Preferably, each of the code correlators 50 and 60A–B includes parallel correlators for providing two or more sets of correlation data. In the typical case for two parallel correlators, the code correlator 50 would look at code positions zero and zero plus one-half chip, the code correlator 60A would look at code positions one and one plus one-half chips, and the code correlator 60B would look at code positions two and two plus one-half chips. Additional code correlators could look a additional code positions in the same manner. After correlating across all 2500 supersamples (for a 2.5 MHz clock) all the channels are incremented for a second pass. In the second pass, the code correlator 50 would look at code positions three and three plus one-half chip, the code correlator 60A would look at code positions four and four plus one-half chips, and the code correlator 60B would look at code positions five and five plus one-half chips. For the channel cluster 30 having five of the standard channels 22 with one of the enhanced channels 18 only half as many passes would be required. Alternatively, the system could be designed so that each of the code correlators 50 and 60A–B searches a contiguous set of code positions.

The standard tracking channel 22A includes a carrier frequency leveler 62A, a PRN code generator 64A, a delay circuit 66A, and the code correlator 60A. Similarly, the standard tracking channel 22B includes a carrier frequency leveler 62B, a PRN code generator 64B, a delay circuit 66B, and the code correlator 60B. The PRN code generators 64A–B include code NCOs 68A–B and phase generators 70A–B, respectively. The carrier frequency levelers 62A–B include carrier NCOs 72A–B, respectively, and carrier mixers 74A–B, respectively.

The code correlators 60A–B include code mixers 76A–B, respectively, and code accumulators 78A–B, respectively. In the tracking mode, the carrier NCOs 72A–B adjust the frequency the carrier clock received from the reference clock system 16 according to respective feedback adjustments received from the signal processor 24 for providing respective carrier frequency leveling signals for selected GPS satellites. The carrier mixers 74A–B multiply the I & Q sample stream (I/Q) from the frequency downconverter 14 by the carrier frequency leveling signals for providing respective streams of frequency leveled signal samples. In the tracking mode, the feedback adjustments from the signal processor 24 substantially eliminate the effects of the frequency error and Doppler frequency shifts from the effective carrier frequency in the frequency leveled sample stream. In the acquisition mode, the carrier clock is switched off by the A/T switch section 34A, thereby substantially reducing the power consumed by the carrier frequency levelers 62A–B; and the code clocks are switched off by the A/T switch sections 34F–G, thereby substantially reducing the power consumed by the PRN code generators 64A–B.

In the tracking mode, the code NCOs 68A–B adjust the frequency of a code clock received from the reference clock system 16 according to a feedback adjustment received from the signal processor 24 for providing code frequency signal for the selected GPS satellite. The phase generators 70A–B use the code frequency signal as time bases for generating the PRN codes for selected GPS satellites and then adjust position offsets of the respective codes according to feedback adjustment signals from the signal processor 24 or extra cycle from the code NCOs 68A–B for providing respective replica PRN code sample streams to the code correlators 60A–B. The code mixers 76A–B multiply the replica PRN code samples by the frequency leveled samples from the carrier frequency levelers 62A–B, respectively, in a conventional manner.

In the acquisition mode, the processing of the supersamples is shared by the code correlators 50 and 60A–B. A delay circuit 66 in the enhanced channel 18 and the delay circuits 66A–B delay the replica PRN code from the phase generator 52 by a number of code positions equal to the number of parallel correlators in the code correlators 50 and 60A–B, respectively. The delay circuit 66B passes a delayed replica PRN code so that it can be used by a standard channel 22C if it is installed in the cluster 30. The code mixers 76A–B in the code correlators 60A–B multiply portions of the delayed replica PRN code sample streams position-by-position by portions of the supersamples at the same positions in the code epoch. In either mode, the products formed by the code mixers 76A–B are accumulated in the code accumulators 78A–B for providing correlation data to the signal processor 24.

The acquisition/track controller 32 provides switch signals noted in FIG. 2 as "S". The A/T switch sections 34A–J are controlled by the acquisition/track controller 32 to switch sample stream signals and clocks for the acquisition mode or the tracking mode. The A/T switch section 34A passes the carrier clock signal to the tracking channels 22A–B in the tracking mode so that the channels 22A–B operate normally and inhibits the clock signal in acquisition mode in order to reduce power consumption during acquisition. In the acquisition mode, the A/T switch sections 34B, 34C and 34D pass the supersamples from the signal memory 44 to the code correlators 50, 60A and 60B, respectively. In tracking mode, the A/T switch sections 34B, 34C and 34D connect the carrier frequency levelers 42, 62A, and 62B, respectively, to the code correlators 50, 60A and 60B, respectively. The A/T switch section 34E passes an acquisition code clock to the code correlators 50, 60A and 60B for acquisition and a tracking code clock to the code correlators 50, 60A and 60B for tracking. The A/T switch sections 34F and 34G pass the code clock signal to the code NCOs 68A and 68B, respectively, for tracking; and inhibit the clock signal in order to reduce power consumption during acquisition. The A/T switch sections 34H and 34I pass the PRN replica code sample streams to the code correlators 60A–B from the phase generators 70A–B, respectively, for tracking; and from the phase generator 52 for acquisition.

Figure 3:
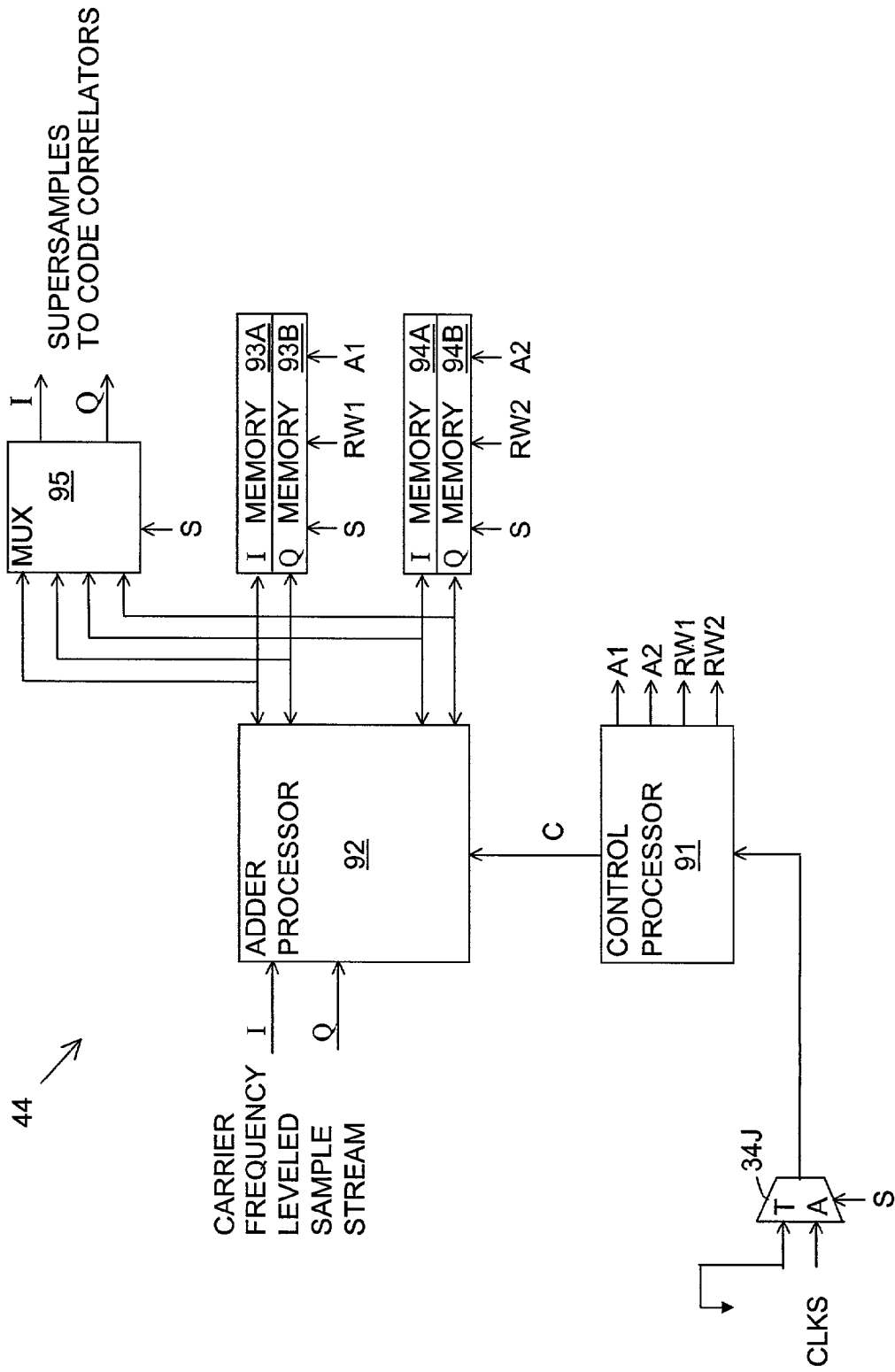
FIG. 3 is a block diagram of a signal memory of the memory-enhanced channel of FIG. 2.

FIG. 3 is a block diagram of a preferred embodiment of the signal memory 44. The signal memory 44 includes the A/T switch section 34J, a control processor 91; an adder processor 92; a first pair of complex basic memory blocks referred to as I Memory 93A and Q Memory 93B; a second pair of complex memory blocks referred to as I Memory 94A and Q Memory 94B; and a multiplexer (MUX) 95. The A/T switch section 34J passes clock signals to the control processor 91 for accumulating supersamples and inhibits the clock signals in order to save power when the memory 44 is being bypassed. The control processor 91 provides memory controls C, $RW_1$, $RW_2$, $A_1$, and $A_2$. The control C comprises clock signals for controlling the timing of the epochs and the accumulation time period. The controls $RW_1$ and $RW_2$ set the memory pairs to read or to write modes and the controls $A_1$ and $A_2$ set their addresses.

The adder processor 92 supplies I and Q samples to one or the other of the memory pairs 93A–B and 94A–B without accumulation during a first PRN code repetition period in the accumulation (integration) period and then supplies to that memory pair 93A–B or 94A–B an accumulation of the samples, termed supersamples, during subsequent PRN code repetition periods in the integration period. The I Memory 93A and Q Memory 93B form a memory pair that undergoes identical addressing modes. For example, they may be driven from the same address $A_1$ and they may both be read or written to at the same time with the read/write control $RW_1$.

Similarly, the I Memory 94A and Q Memory 94B form a memory pair that undergoes identical addressing modes. For example, they may be driven from the same address $A_2$ and they may both be read or written to at the same time with the read/write control $RW_2$.

Typically, when one of the memory pairs is being written to, the other memory pair is being read back into the fast playback correlation process. While the memory pair that is being written to operates at the slow clock rate, for example 2.5 MHz, the memory pair that is being read from would be operating at the fast clock rate, for example 25 MHz. In an exemplary case, the signal memory 44 accumulates samples for 20 milliseconds of the frequency leveled sample stream into supersamples representative of one millisecond of the frequency leveled sample stream. The buffering process provided by the use of two separates memory pairs allows the last twenty milliseconds of memory accumulation to be processed by the code correlators 50 and 60A–B at a fast rate while the next twenty milliseconds memory accumulation is being collected at a slow realtime rate. Each of the memory devices (I Memory 93A, Q Memory 93B, I Memory 94A, Q Memory 94B) contains enough storage space for all supersamples for a one millisecond period. When a 2.5 MHz slow clock is used, this leads to storage of 2500 words for each of the memory devices. The width of each word in storage would be dependent on the number of bits in the input samples, the period over which the accumulation is to take place, and any compression algorithm that might be applied.

The physical memory type used in the I and Q memories 93A–B,94A–B may be one of a variety of different types. Examples include static RAM (SRAM) and dynamic RAM (DRAM). Depending on the state of the art in memory devices, SRAM may be faster (allowing higher clock rates), while DRAM may use less surface area in an integrated circuit and may be cheaper. Other memory devices may be used. These memory devices may have one or more multiple access ports. The main requirement is that the memory device may play back at an accelerated rate. A more detailed description of the signal memory 44 is contained in U.S. patent application 09/512,243 by Lennen incorporated by reference herein. The A/T switch section 34F passes a clocking signal into the signal memory 44 during the acquisition mode and inhibits the clocking signal during tracking mode in order to minimize power consumption.

Figure 4:
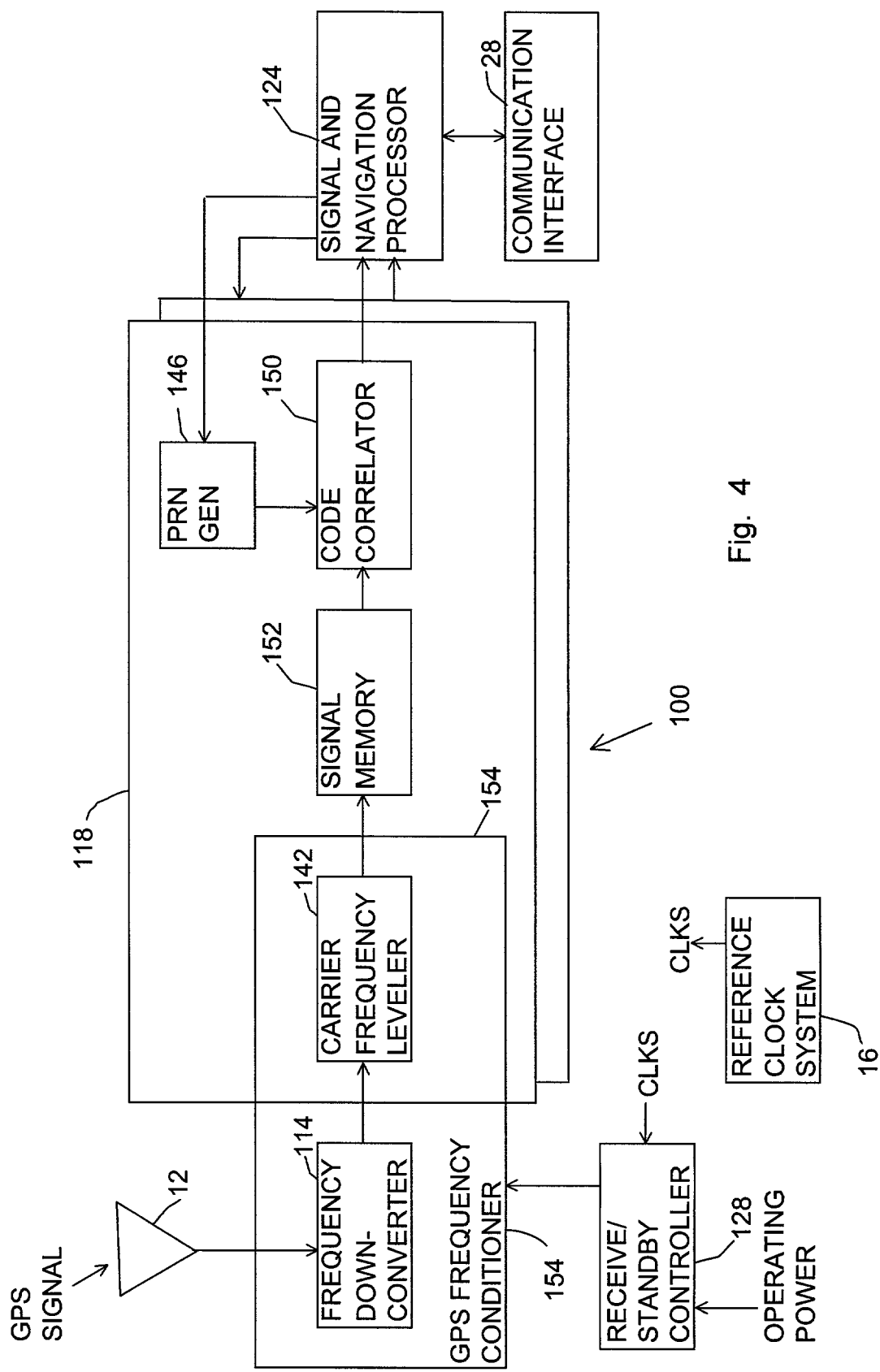
FIG. 4 is a block diagram of another embodiment of the GPS receiver of the present invention.

FIG. 4 is a block diagram of another embodiment of the GPS receiver of the present invention referred to with a reference number 100. The GPS receiver 100 includes a frequency downconverter 114 analogous to the frequency downconverter 14, one or more channels 118 analogous to the channels 18, and a signal processor 124 analogous to the combination of the signal and navigation processors 24 and 26. The receiver 100 also includes the GPS antenna 12, the reference clock system 16, the communication interface 28, and a receive/standby (R/S) controller 128.

The channel(s) 118 include a frequency leveler 142 analogous to the frequency leveler 42, a PRN generator 146 analogous to the PRN generator 46, and a code correlator 150 analogous to the code correlator 50. The channels also include a signal memory 152 and a frequency conditioner 154. In one embodiment the frequency conditioner 154 includes the frequency downconverter 114 and the carrier frequency leveler 142. In an alternative embodiment the frequency conditioner 154 is defined as the frequency downconverter 114 by itself. The frequency conditioner 154 has a receive mode for normal operation and a low power standby mode where operation is suspended. For the standby mode, the RIS controller 128 controls switches for stopping or disabling the operating power to the analog hardware circuits and stopping or disabling the clock signals to the digital hardware circuits. Methods and apparatus for switching between the receive mode and the low power standby condition are disclosed in U.S. Pat. No. 5,448,773 by McBurney for a Long Life Portable Global Position System Receiver; U.S. Pat. No. 5,592,173 by Lau et al. for a GPS Receiver Having a Low Power Standby Mode; U.S. Pat. No. 5,650,785 by Rodal et. al. for a Low Power GPS Receiver all of which are incorporated by reference herein.

In order to initiate the signal acquisition process, the R/S controller 128 switches the frequency conditioner 154 into the receive mode. In the receive mode, the frequency conditioner 154 operates normally for downconverting the RF GPS signal to a lower frequency, sampling the lower frequency signal, and issuing a representation of the lower frequency GPS signal as a sample stream as described above. The signal memory 152 receives the sample stream and stores the samples over a certain time period. In a first embodiment, the signal memory 152 stores samples for one or more sequential epochs. For example, for an epoch of one millisecond at a 2.5 MHz sample rate, there would be 2500 stored samples for I and 2500 stored samples for Q. For two epochs the would be 5000 stored samples for I and 5000 for Q, and so on. In a second embodiment, the signal memory 152 accumulates supersamples in the manner described above for the signal memory 44.

Then, when the samples are stored in the signal memory 152, the R/S controller 128 switches the frequency conditioner 154 into the standby mode. In the standby mode, the frequency conditioner 154 suspends or discontinues operation in order to reduce power consumption. While the frequency conditioner 154 is in the standby mode, the code correlator 150 continues the signal acquisition process by correlating the stored samples with the locally generated PRN code from the PRN generator 146 for providing correlation data. In order to complete the GPS signal acquisition the frequency conditioner 154 may be switched back and forth between the receive mode and the low power standby mode any number of times.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receiver for receiving a signal having epochs of a repeating signal code, comprising:

a first channel having a first carrier frequency leveler for providing first frequency leveled signal samples, a signal memory for accumulating said first frequency leveled samples over two or more said epochs according to positions within said epochs for providing supersamples for a signal acquisition mode, and first code correlators for correlating said supersamples with first locally generated code samples for providing acquisition correlation data;

at least one second channel having a second carrier frequency leveler for providing second frequency leveled signal samples and second code correlators for correlating said second frequency leveled samples with second locally generated code samples for a signal tracking mode for providing tracking correlation data; and an acquisition/tracking (A/T) switch for switching said second code correlators from the second channel to the first channel for said acquisition mode for augmenting said first code correlators for correlating said supersamples and providing further acquisition correlation data.

2. The receiver of claim 1, wherein:
the A/T switch is further for bypassing said signal memory for said tracking mode, said first code correlators for correlating said first frequency leveled signal samples with said first locally generated code samples for providing further tracking correlation data.

3. The receiver of claim 1, wherein:
the A/T switch passes a carrier clock signal for operating said second carrier frequency leveler for said tracking mode and inhibits said carrier clock signal for disabling operation of said second carrier frequency leveler for said acquisition mode.

4. The receiver of claim 1, wherein:
the A/T switch switches a delayed representation of said first locally generated code samples to said second code correlators for said acquisition mode, said second code correlators for correlating said supersamples with said delayed first locally generated code samples for providing said further acquisition correlation data.

5. The receiver of claim 1, wherein:
the second channel includes a second code generator for providing said second locally generated code samples; and
the A/T switch passes a code clock signal for operating a second code generator for said tracking mode and inhibits said code clock signal for disabling operation of said second code generator for said acquisition mode.

6. The receiver of claim 1, wherein:
said signal memory accumulates said supersamples in realtime and issues said supersamples to said first and second code correlators at a rate faster than realtime for said acquisition mode.

7. A method for receiving a signal having epochs a repeating signal code, comprising:
providing a signal acquisition mode and a signal tracking mode in a receiver;
for said acquisition mode, leveling a first carrier frequency for providing first frequency leveled signal samples; accumulating said first frequency leveled samples over two or more said epochs according to positions within said epochs for providing supersamples; and using first code correlators for correlating said supersamples with first locally generated code samples for providing acquisition correlation data;

for said tracking mode, leveling a second carrier frequency for providing second frequency leveled signal samples; and using second code correlators for correlating said second frequency leveled samples with second locally generated code samples for providing tracking correlation data; and for said acquisition mode, switching said second code correlators for augmenting said first code correlators for correlating said supersamples and providing further acquisition correlation data.

8. The method of claim 7, further comprising:
for said tracking mode, bypassing said step of accumulating said first carrier frequency leveled samples; and using said first code correlators for correlating said first frequency leveled signal samples with said first locally generated code samples for providing further tracking correlation data.

9. The method of claim 7, further comprising:
for said tracking mode, passing a carrier clock signal for operating said second carrier frequency leveler; and
for said acquisition mode obstructing said carrier clock signal for disabling said second carrier frequency leveler.

10. The method of claim 7, further comprising:
for said acquisition mode, switching a delayed representation of said first locally generated code samples to said second code correlators; and correlating said supersamples with said delayed first locally generated code samples.

11. The method of claim 7, further comprising:
for said tracking mode, passing a code clock signal for operation of a code generator for providing said second locally generated code samples; and
for said acquisition mode, obstructing said code clock signal for inhibiting said operation of said code generator.

12. The method of claim 7, wherein:
said step of accumulating said first carrier frequency leveled samples includes accumulating said samples at a realtime rate; and said step of correlating said supersamples includes reading said supersamples at a rate faster than said realtime rate.

13. A GPS receiver, comprising:
a frequency conditioner for receiving a GPS signal, the frequency conditioner having a receive mode for performing an operation for providing a representation of said GPS signal as a sample stream, and a low power standby mode where said operation is suspended;
a signal memory for storing a certain time period of said representation of said GPS signal as stored samples when the frequency conditioner is in said receive mode and then retaining said stored samples when the frequency conditioner is in said standby mode;
code correlators for correlating said stored samples with locally generated code samples for providing correlation data when the frequency conditioner is in said standby mode; and wherein:
the frequency conditioner includes a frequency downconverter for receiving said GPS signal at a radio frequency (RF), downconverting said RF GPS signal to a lower frequency and sampling said lower frequency GPS signal for providing lower frequency GPS signal samples;

the frequency conditioner further includes a carrier frequency leveler for receiving said lower frequency GPS signal samples, leveling effective carrier frequency in said lower frequency GPS signal samples, and issuing carrier frequency leveled samples as said representation of said GPS signal; and the signal memory accumulates samples of said first frequency leveled sample stream over two or more code epochs of said GPS signal according to positions within said epochs for providing supersamples and retains said supersamples as said stored samples for correlation by the code correlators.

14. The GPS receiver of claim 13, further comprising:
a receive/standby (R/S) controller for inducing said low power standby mode by stopping a clock signal in said frequency conditioner.

15. The GPS receiver of claim 13, further comprising:
a receive/standby (R/S) controller for inducing said low power standby mode by obstructing operating power to said frequency conditioner.

16. A method for reducing power consumption in a receiver for receiving a GPS signal, comprising:
providing a receive mode and a low power standby mode for said receiver;
in said receive mode, performing a conversion operation for providing a representation of said GPS signal as a sample stream; and storing a certain time period of said representation of said GPS signal as stored samples;
in said standby mode, suspending said conversion operation; and correlating said stored samples with locally generated code samples for providing correlation data; and wherein:
the step of performing said conversion operation includes receiving said GPS signal at a radio frequency (RF), downconverting said RF GPS signal to a lower frequency; and sampling said lower frequency GPS signal for providing lower frequency GPS signal samples;
the step of performing said conversion operation further includes leveling effective carrier frequency in said lower frequency GPS signal samples; and issuing carrier frequency leveled samples as said representation of said GPS signal; and
the step of storing said certain time period of said representation of said GPS signal includes accumulating samples of said first frequency leveled sample stream over two or more code epochs of said GPS signal according to positions within said epochs for providing supersamples and retaining said supersamples as said stored samples.

17. The method of claim 16, wherein:
the step of providing said receive mode and said standby mode includes inducing said standby mode by stopping a clock signal.

18. The method of claim 16, wherein:
the step of providing said receive mode and said standby mode includes inducing said standby mode by obstructing operating power.

* * * * *